United States Patent Office 2,921,560
Patented Jan. 19, 1960

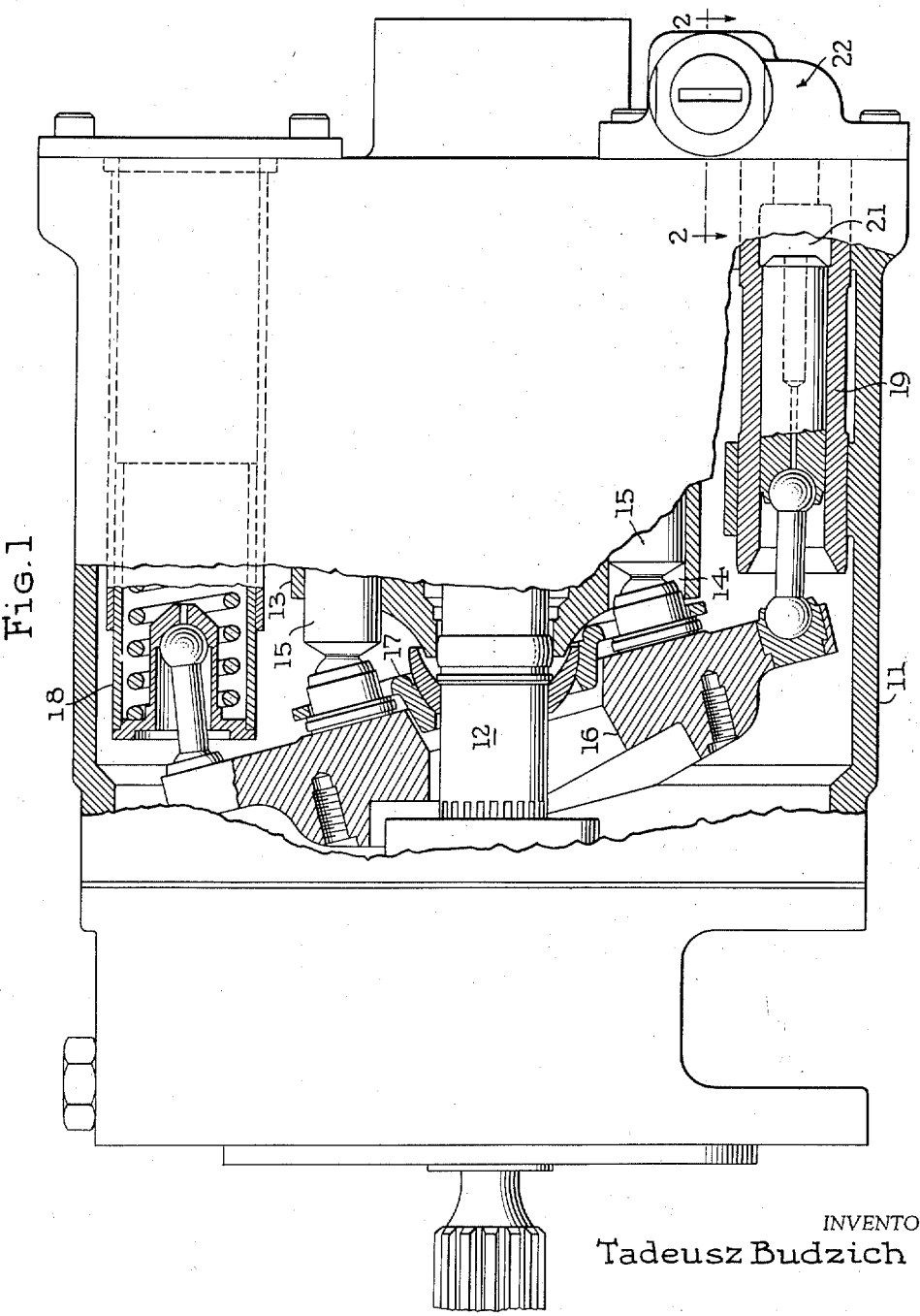

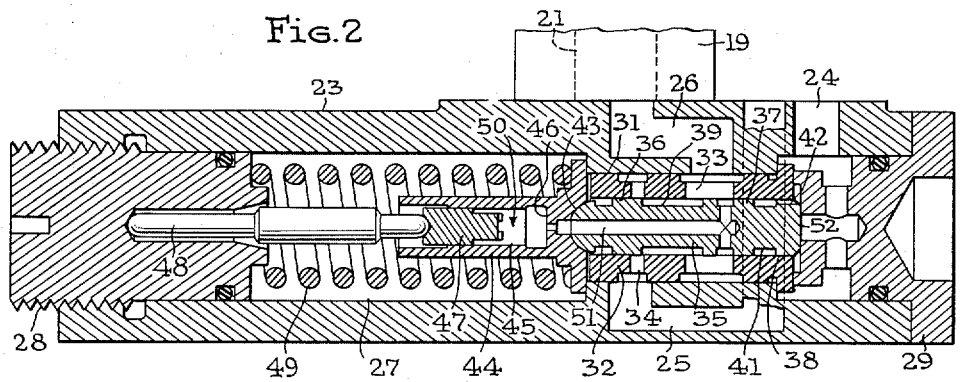
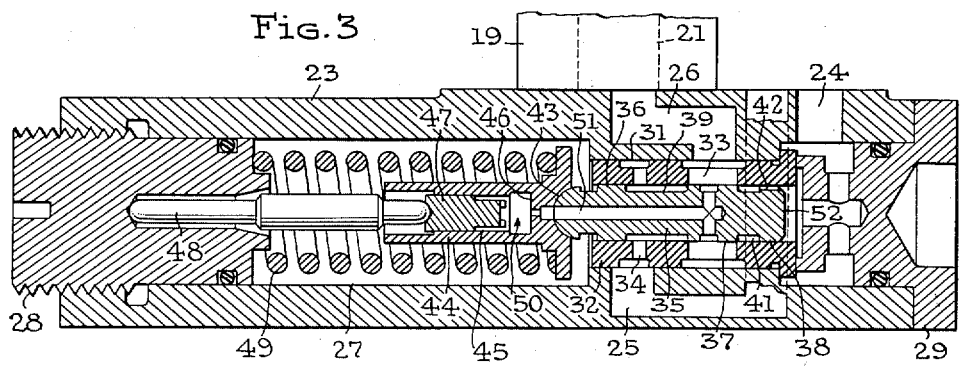
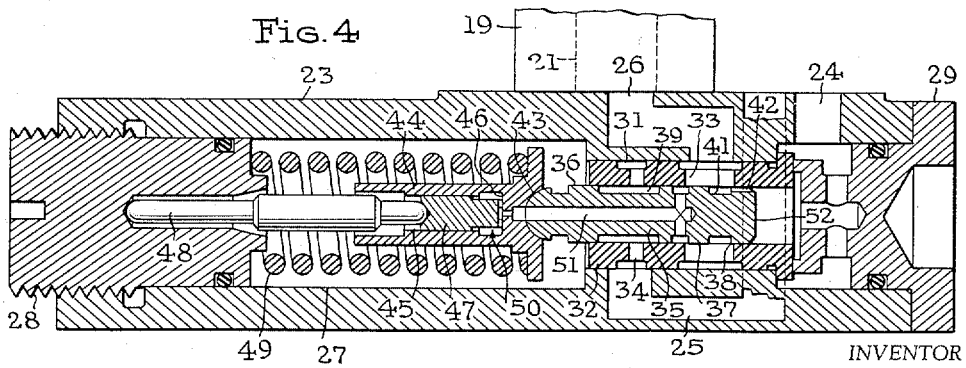

2,921,560
ENGINE CONTROL

Tadeusz Budzich, Watertown, N.Y., assignor to The New York Air Brake Company, a corporation of New Jersey Application September 23, 1957, Serial No. 685,530

6 Claims. (Cl. 121—38)

This invention relates to fluid pressure engines and more particularly to devices for varying the displacement of these engines in response to an input pressure. The term engine is used herein in its generic sense and includes devices which operate as pumps as well as those which operate as motors.

Many engines in use today employ control devices for varying displacement in response to variations in an applied pressure. A typical illustration of this is the pressure-limiting control for pumps in which displacement is varied in inverse relation to discharge pressure. Devices of this type usually include a displacement varying element, a spring biasing the element toward a maximum displacement establishing position, and a control motor responsive to discharge pressure for moving the displacement varying element toward the minimum displacement establishing position against the bias of the spring. Since the force exerted by the spring varies with its deflection, it will be apparent that the control motor must exert a progressively increasing force in order to move the displacement varying element through its controlling range, i.e., from its maximum to its minimum displacement establishing position. This means that the discharge pressure must also change during this period, and for convenience, the change in pressure necessary to effect movement of the displacement varying element through its controlling range will hereinafter be called the control differential.

In high performance hydraulic systems, large fluctuations in the discharge pressure of the supply pump are intolerable and consequently, small control differentials are essential. Applicant's co-pending application Serial No. 666,857, filed June 20, 1957, discloses mechanism for achieving this end in one type of pump, but the solution is not generally applicable to all engines.

The object of this invention is to provide a displacement control device for use in any type of engine which affords small control differentials and which is stable and free from hunting. Briefly, the invention comprises a displacement varying element, a biasing spring, and a control motor as in the prior art devices, but in addition includes a control valve which, when discharge pressure is below a predetermined value, vents the control motor, and, when discharge pressure exceeds this value, establishes a pressure in the motor which is proportional to the difference between the discharge pressure and said predetermined value. One feature of the valve is that it affords a convenient way of changing the factor of proportionality so that the control differential can be varied without changing the biasing spring acting on the displacement varying element. Because of this feature the control differential can be reduced to any desired practical value.

Another feature of the valve resides in the fact that it includes a feed-back network which tends to improve the stability of the control device.

A preferred embodiment of the invention will now be described in relation to the accompanying drawings, in which:

Fig. 1 is an elevation view of a typical pump incorporating the displacement control device; the housing of the pump being broken away to show the essential parts of the control mechanism.

Fig. 2 is an enlarged sectional view of the control valve taken on line 2—2 of Fig. 1 and showing the plunger in one of its limiting positions.

Fig. 3 is an enlarged sectional view of the control valve showing the plunger in its intermediate lap position.

Fig. 4 is an enlarged sectional view of the control valve showing the plunger in its other limiting position.

Referring to Fig. 1, the pump to be controlled comprises a housing 11, a drive shaft 12, and a rotary cylinder barrel 13 mounted on and in driving relation with the drive shaft. The cylinder barrel contains a circumferential series of longitudinal cylinder bores 14 which receive slidable pistons 15. A cam plate 16 and nutating plate 17 cooperate in a well known manner to reciprocate the pistons. A distributing valve (not shown) sequentially connects each cylinder bore with the inlet and discharge conduits of the pump (not shown) as the cylinder barrel rotates. The cam plate 16 is supported by a yoke and trunnions (not shown) for angular adjustment about an axis extending in a direction normal to the axis of drive shaft 12 and is biased toward its maximum displacement establishing position by a spring plunger 18. The cam plate is shown in this position in Fig. 1. A control motor 19, located on the opposite side of the shaft from the spring plunger 18, is connected with the cam plate for moving it toward its minimum displacement establishing position against the bias of the spring plunger. The pressure in the working chamber 21 of the control motor is varied by a control valve 22 connected therewith.

Referring to Fig. 2, the control valve comprises a housing 23 having an inlet passage 24 connected with the discharge conduit of the pump, an exhaust passage 25 connected with the interior of the pump housing, and a motor passage 26 connected with the control motor working chamber 21. The valve housing is formed with a longitudinal bore 27 having enlarged end portions which are closed and sealed by plugs 28 and 29, and an intermediate reduced diameter portion 31 in which is located a valve sleeve 32. The valve sleeve 32 contains two ports 33 and 34 which communicate, respectively, with motor passage 26 and exhaust passage 25. Mounted in the sleeve is a slidable valve plunger 35 carrying annular lands 36, 37 and 38 separated by annular grooves 39 and 41. The land 38 contains a longitudinal slot 42 for connecting the annular groove 41 with the inlet passage 24.

The left end of valve plunger 35 carries a hemispherical head 43 which engages a similarly formed recess in cylinder block 44 and supports the block for universal movement relatively to the plunger. This block contains a longitudinal cylinder bore 45 which is coaxial with valve plunger 35 and terminates at end wall 46. A slidable piston 47, seated on one of the spherical ends of a piston rod 48, is mounted in bore 45 and together with the end wall 46 defines a motor working chamber 50. The opposite end of the piston rod is loosely received within and abuts against the bottom of a bore formed in plug 28. The spherical ends of the piston rod serve as universal joints and insure alignment of piston 47 and bore 45. Surrounding piston rod 48 and cylinder block 44 is a spring 49 which reacts between plug 28 and the cylinder block for biasing the valve plunger into contact with plug 29. A passage 51, extending through the valve plunger and the cylinder block, connects working chamber 50 with motor port 33.

Operation of the invention

When the pump is at rest, spring 49 biases the valve plunger 35 to the Fig. 2 position thereby establishing communication between motor passage 26 and exhaust passage 25 through ports 33 and 34 and annular groove 39. This connection vents the control motor working chamber 21 and, as a result, allows spring plunger 18 to move the cam plate 16 to its maximum displacement establishing position. When the pump is running, discharge pressure transmitted to the control valve inlet passage 24 will act against the surface 52 of valve land 38 and shift the plunger to the left against the bias of spring 49. As this pressure increases, the plunger will move to its lap position, shown in Fig. 3, in which valve land 37 interrupts the communication between ports 33 and 34. For convenience, the pressure required to hold the valve in this position against the bias of spring 49 will be termed the reference pressure. A further increase in discharge pressure will move the plunger to the position shown in Fig. 4, wherein motor passage 26 and passage 51 are connected with inlet passage 24 via port 33, annular groove 41 and longitudinal slot 42. The pressure in working chambers 21 and 50 will now increase and as it does, the force produced by the pressure in chamber 50 acting against end wall 46 plus the force of spring 49 will move the plunger 35 to the right toward its lap position. When the sum of these forces equals the force produced by the pressure in inlet passage 24 acting on the surface 52, the valve plunger will be in its lap position. The pressure thus established in the control motor working chamber 21 equals the difference between the discharge pressure and the reference pressure multiplied by the ratio of the area of the surface 52 to the cross-sectional area of piston 47. After the pressure in working chamber 21 becomes large enough to overcome the bias of spring plunger 18, further increases in discharge pressure will cause motor 19 to move the cam plate toward its minimum displacement establishing position.

A numerical example of the operation of this device will prove helpful in understanding the invention. Let it be assumed that:

(1) The maximum desirable discharge pressure is 3,000 p.s.i.

(2) The control differential of spring plunger 18, cam plate 16 and control motor 19 is 30 p.s.i.

(3) A control motor working chamber pressure of 1,030 p.s.i. is required to hold the cam plate in its minimum displacement establishing position.

(4) The area of the surface 52 is 0.2 square inch.

(5) The area of the piston 47 is 0.1 square inch.

Using these values and remembering that the pressure established in working chamber 21 by control valve 22 equals the difference between the discharge pressure and the reference pressure multiplied by the ratio of the area of the surface 52 to the area of the piston 47, it is possible to calculate the reference pressure (X) from the following equation:

$$(3{,}000 - X)\frac{0.2}{0.1} = 1{,}030$$

In this example, the reference pressure must be 2,485 p.s.i. in order for the cam plate to reach its minimum displacement establishing position at the same time as the discharge pressure reaches 3,000 p.s.i. This means that the pump will supply fluid at a maximum rate until the discharge pressure reaches 2,985 p.s.i., and that thereafter, as the pressure continues to increase to the desired maximum of 3,000 p.s.i., the supply rate will decrease progressively to a predetermined minimum. It can thus be seen that the resultant control differential is only 15 p.s.i., even though the control differential of the spring, cam plate and control motor is 30 p.s.i. By varying the diameter of cylinder bore 45 and consequently the area of piston 47, it is possible to obtain a resultant control differential of any desired magnitude without changing the rate of spring plunger 18. In the above example, if the ratio of the areas of surface 52 and piston 47 were one, then the control differential would be 30 p.s.i. On the other hand, a ratio of five would reduce the differential to 6 p.s.i.

If discharge pressure should now decrease from the maximum, the force acting on the surface 52 would decrease and the pressure in motor chamber 50, together with the spring 49, would shift the plunger valve to the right toward the position shown in Fig. 2. This action would again connect the motor passage 26 with the exhaust passage 25 and the pressure in motor chambers 50 and 21 would decrease until the forces acting on the valve plunger were again in balance. If the discharge pressure were still greater than the reference pressure, the plunger would be returned to its lap position. On the other hand, if the discharge pressure had dropped below the reference pressure, the plunger would be moved to a position intermediate the positions shown in Figs. 2 and 3.

As stated previously, the drawings and description relate only to a preferred embodiment of the invention. Since many changes can be made in this embodiment without departing from the inventive idea, the following claims should provide the sole measure of the scope of the invention.

What is claimed is:

1. In an engine of the type including control means movable between minimum and maximum displacement establishing positions for varying the displacement of the engine, resilient means biasing the control means toward one of said displacement establishing positions, and a control motor for moving the control means toward the other of said displacement establishing positions against the bias of the resilient means, the improvement which comprises a control valve having a housing containing a motor passage connected with the control motor, an inlet passage and an exhaust passage; a valve plunger slidable in the housing and having a first limiting position in which it connects the motor passage with the exhaust passage, a second limiting position in which it connects the motor passage with the inlet passage, and an intermediate lap position in which it isolates the motor passage from both the inlet passage and the exhaust passage; a fluid pressure motor for biasing the valve plunger toward its first limiting position and comprising a cylinder block mounted for universal movement on one end of the plunger and containing a cylinder bore coaxial with the plunger, a wall closing one end of the cylinder bore, a slidable motor piston mounted in the bore and defining with the end wall thereof a motor working chamber, and a piston rod universally connected with the motor piston and with the valve housing; a fluid conduit connecting the working chamber with the motor passage; a spring reacting between the valve housing and the cylinder block for biasing the valve plunger toward its first limiting position; and a piston responsive to the pressure in the inlet passage and connected with the valve plunger at its opposite end for shifting it toward its second limiting position against the bias of the spring and the fluid pressure motor.

2. The improvement defined in claim 1 in which the area of the motor piston is less than the area of the piston at the opposite end of the valve plunger.

3. In an engine of the type including control means movable between minimum and maximum displacement establishing positions for varying the displacement of the engine, resilient means biasing the control means toward one of said displacement establishing positions, and a control motor for moving the control means toward the other of said displacement establishing positions against the bias of the resilient means, the improvement which comprises a control valve having a housing containing a motor passage connected with the control motor, an inlet passage and an exhaust passage; a valve plunger slidable in the housing and having a first limiting position in which it connects the motor passage with the exhaust passage, a second limiting position in which it connects the motor passage with the inlet passage, and an intermediate lap position in which it isolates the motor passage from both the inlet passage and the exhaust passage; a spring biasing the valve plunger toward its first limiting position; a fluid pressure motor for biasing the valve plunger toward its first limiting position and comprising a working chamber and two relatively movable motor elements, one of said elements being universally connected with one end of the valve plunger and the other element being universally connected with the valve housing; a fluid conduit connecting the working chamber with the motor passage; and a piston responsive to the pressure in the inlet passage and connected with the valve plunger at its opposite end for shifting it toward its second limiting position against the bias of the spring and the fluid pressure motor.

4. In an engine of the type including control means movable between minimum and maximum displacement establishing positions for varying the displacement of the engine, resilient means biasing the control means toward one of said displacement establishing positions, and a control motor for moving the control means toward the other of said displacement establishing positions against the bias of the resilient means, the improvement which comprises an inlet passage and an exhaust passage; a motor passage connected with the control motor; a shiftable valve having a first limiting position in which it connects the motor passage with the exhaust passage, a second limiting position in which it connects the motor passage with the inlet passage, and an intermediate lap position in which it isolates the motor passage from both the inlet passage and the exhaust passage; resilient means biasing the valve toward its first limiting position; and two opposed movable abutments connected with the valve, the first abutment being subject to the pressure in the motor passage and urging the valve toward its first limiting position, and the second abutment being subject to the pressure in the inlet passage and urging the valve toward its second limiting position.

5. The improvement defined in claim 4 in which the areas of the two abutments are unequal and the second abutment has the greater area.

6. In an engine of the type including control means movable between minimum and maximum displacement establishing positions for varying the displacement of the engine, resilient means biasing the control means toward one of said displacement establishing positions, and a control motor for moving the control means toward the other of said displacement establishing positions against the bias of the resilient means, the improvement which comprises an inlet passage and an exhaust passage; a motor passage connected with the control motor; a shiftable valve having a first limiting position in which it connects the motor passage with the exhaust passage, a second limiting position in which it connects the motor passage with the inlet passage, and an intermediate lap position in which it isolates the motor passage from both the inlet passage and the exhaust passage; resilient means biasing the valve toward its first limiting position; and two fluid pressure motors, one being responsive to the pressure in the motor passage and urging the valve toward its first limiting position, and the other being responsive to the pressure in the inlet passage and urging the valve toward its second limiting position.

References Cited in the file of this patent

UNITED STATES PATENTS

| | | |
|---|---|---|
| 2,516,924 | Sedgwick | Aug. 1, 1950 |
| 2,530,242 | Harrington | Nov. 14, 1950 |
| 2,624,321 | Levetus | Jan. 6, 1953 |
| 2,643,613 | Westbury et al. | June 30, 1953 |
| 2,716,946 | Hardy | Sept. 6, 1955 |
| 2,722,946 | Mueller | Nov. 8, 1955 |
| 2,727,525 | Harris | Dec. 20, 1955 |
| 2,769,393 | Cardillo et al. | Nov. 6, 1956 |
| 2,771,843 | Brown | Nov. 27, 1956 |
| 2,785,699 | Creson et al. | Mar. 19, 1957 |